United States Patent [19]
Hedrick

[11] Patent Number: 5,940,035
[45] Date of Patent: Aug. 17, 1999

[54] METHOD FOR CALIBRATING AIRCRAFT ALTITUDE SENSORS

[75] Inventor: Geoffrey S. M. Hedrick, Malvern, Pa.

[73] Assignee: Innovative Solutions & Support Inc., Malvern, Pa.

[21] Appl. No.: 09/049,336

[22] Filed: Mar. 27, 1998

Related U.S. Application Data

[60] Provisional application No. 60/042,422, Mar. 27, 1997.

[51] Int. Cl.$^6$ ...................................................... G01S 3/02
[52] U.S. Cl. ............................ 342/462; 342/38; 342/174; 340/977
[58] Field of Search ........................ 342/38, 174, 357.01, 342/462; 340/970, 977, 870.1

[56] References Cited

U.S. PATENT DOCUMENTS

| | | | |
|---|---|---|---|
| 4,292,671 | 9/1981 | Evans et al. .............................. | 364/433 |
| 4,431,994 | 2/1984 | Gemin ................................... | 343/12 A |
| 5,272,639 | 12/1993 | McGuffin ............................... | 364/449 |
| 5,402,116 | 3/1995 | Ashley ................................. | 340/870.1 |
| 5,627,546 | 5/1997 | Crow ..................................... | 342/352 |
| 5,646,857 | 7/1997 | McBurney et al. ...................... | 364/440 |

OTHER PUBLICATIONS

"About the North Atlantic RVSM Implementation Program", http://www.arinc.com/Ind_Gvt_Srv/RVSM/about.html, pp. 1–3.
"RVSM Operations", http://www.faa.gov/AUA/ipt_prod/oceanic/enhance/rvsmpol.txt,Jul. 18, 1996, pp. 1–3.
"Gander Oceanic Reports New Amendment", http://www.ar–group.com/mktg/newsrels/rvsm.htm, p. 1.
"Reduced Vertical Separation", http://www.faa.gov/AUA/ipt_prod/oceanic/rvsm.htm, pp. 1–3.
"RVSM Approval Process", ARINC, http://www.arinc.com/Ind_Govt_Srv/RVSM/approval.html,Aug. 6, 1997, p. 1.
"Reduced Vertical Separation Minima", ARINC, http://www.arinc.com/Ind_Govt_/RVSM/rvsm.html, pp. 1–2.
"Aircraft Monitoring", ARINC, http://www.arinc.com/Ind_Govt_Srv/RVSM/ap2.html,pp. 1–4.
"Business and Commuter Aviation System", Honeywell, http:/www.cas.honeywell.com/bcas/pubs/rvsm.html, pp. 1–3.
Implementation of a Reduced Vertical Separation Mimimum Above FL 290 in the North Atlantic Region: Monitoring Procedures for the Verification of Aircraft Height Keeping Performance, pp. 1–2.
"Example Operator Application for Approval to Conduct Operations in Airspace Where RVSM is Applied", Nov. 13, 1996, p. 33.

*Primary Examiner*—Thomas H. Tarcza
*Assistant Examiner*—Dao L. Phan
*Attorney, Agent, or Firm*—Cohen, Pontani, Lieberman & Pavane

[57] ABSTRACT

A method for calibrating a pressure-sensing altitude sensor of an aircraft while the aircraft is in flight. The method includes the steps of obtaining a set of reference atmospheric pressures as a function of height above a base station by affixing a reference pressure sensor to a balloon. As the balloon is released into the atmosphere, the reference sensor continuously measures the atmospheric pressures and transmits the data back to the base station while a ground-based radar disposed adjacent the base station measures the height of the balloon. An aircraft flying in a vicinity of the base station can calibrate its pressure-sensing altitude sensors by measuring the atmospheric pressure outside the aircraft and its geometric height relative to the base station and then comparing the pressure measurements with corresponding reference pressure values at a geometric height that is substantially that same as the geometric height of the aircraft.

13 Claims, 1 Drawing Sheet

METHOD FOR CALIBRATING AIRCRAFT ALTITUDE SENSORS

CROSS REFERENCE

This application claims the benefit of a prior-filed co-pending provisional. application, Ser. No. 60/042,422, that was filed on Mar. 27, 1997.

BACKGROUND OF THE INVENTION

1. Field of the Invention

The present invention relates to methods of calibrating aircraft sensors and, more particularly, to a method for calibrating pressure-sensing altitude sensors of an aircraft while the aircraft is in flight.

2. Description of the Related Art

Recent changes in aircraft flight regulations for flight operations in the North Atlantic Minimum Navigation Performance Specifications (NAT/MNPS) airspace have reduced the minimum allowable vertical distance between two aircraft flying through this airspace from 2,000 feet to 1,000 feet for operation between specified flight levels, currently, Flight Level (FL) 290 and FL 410, inclusive. The Reduced Vertical Separation Minimum, or RVSM, will allow more aircraft to fly more optimal profiles and increase the air traffic capacity through this airspace.

Thus, for safety and air control purposes, it is now more crucial than ever that the aircraft altitude sensors be calibrated with great accuracy, preferably, as often as is possible.

One common type of altitude sensor on an aircraft uses pressure transducers to measure the static atmospheric pressure outside the aircraft. The pressure measurements are converted to the altitude of the aircraft in accordance with government-specified mathematical relations using various electronic or electromechanical means on board the aircraft.

The pressure measurements of these altitude sensors inherently contain various kinds of errors including measurement noise error and bias error. The measurement noise error consists of static source error arising from defects or deformation in the aircraft skin around a static pressure port, quantization error rising from analog to digital conversion, and/or Gaussian measurement noise error. The bias error results from changing weather conditions as the aircraft flies through regions of high or low atmospheric pressure.

Ideally, the altitude sensors are calibrated while the aircraft is in flight since the noise error such as the static source error does not manifest itself until and unless the aircraft is in flight. In the prior art, there are several methods of calibrating aircraft altitude sensors in flight.

One method requires the subject aircraft to tow an aerodynamic cone behind the aircraft at a distance sufficient to avoid the turbulent wake downstream of the aircraft. The cone contains a multitude of reference pressure sensors and recording devices for sensing and recording atmospheric pressures during flight. This method is expensive and highly disruptive in that the aircraft must be removed from service for this test. Furthermore, the altitude measurements of the reference sensors are subject to errors in the range of 50 to 100 feet due to, for example, turbulent air flows induced by the cone and aircraft.

Another known calibration method requires a pacer plane to fly alongside the subject aircraft during a test flight. The pacer plane carries calibrated sensors and recording devices for measuring and recording reference altitude measurements. After the test flight, the sensor measurements of the aircraft are compared with the reference sensor measurements of the pacer plane to determine the magnitude of the errors. This method cannot provide highly accurate static pressure measurements because the reference sensors are also subject to turbulence-induced errors.

In addition to these prior art calibration procedures, there are methods for monitoring the height-keeping performance of the aircraft altimetry system. One height monitoring method requires the aircraft to fly straight and level at a specific flight level over a fixed-based automated height measurement unit, called the Height Monitoring Unit (HMU). The HMU measures the height of the aircraft with a radar. Oftentimes, the aircraft must be diverted from its optimal route for this purpose. This method, however, provides no reference static pressure values for calibrating the aircraft altitude sensors.

Accordingly, there is a need for a convenient, low-cost, high precision method for accurately calibrating aircraft altitude sensors while the aircraft is in flight.

SUMMARY OF THE INVENTION

The present invention provides a method for calibrating a pressure-sensing altitude sensor of an aircraft as it flies through the airspace of a fixedly located base station.

An advantage of the present inventive process is that it does not require the aircraft be removed from service in order to calibrate the altitude sensor.

Another advantage of the present method is that an aircraft can have its altitude sensor calibrated as often as it flies in the vicinity of a base station.

According to a preferred embodiment of the present invention, the method for calibrating a pressure-sensing altitude sensor of an aircraft includes the steps of: (1) elevating a reference pressure sensor through a distance above a fixedly located base station; (2) measuring reference atmospheric pressures using the reference pressure sensor while the reference sensor is continuously elevated above the base station; (3) measuring a reference height of the reference sensor relative to the base station while the reference sensor measures the reference atmospheric pressure; (4) measuring the atmospheric pressure outside the aircraft using the altitude sensor of the aircraft while the aircraft flies in the vicinity of the base station; (5) determining a geometric height of the aircraft relative to the base station while the altitude sensor of the aircraft measures the atmospheric pressure outside the aircraft; and (6) comparing the pressure measurement of the altitude sensor with the reference pressure measurement of the reference pressure sensor at a geometric height that is substantially the same as the geometric height of the aircraft.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
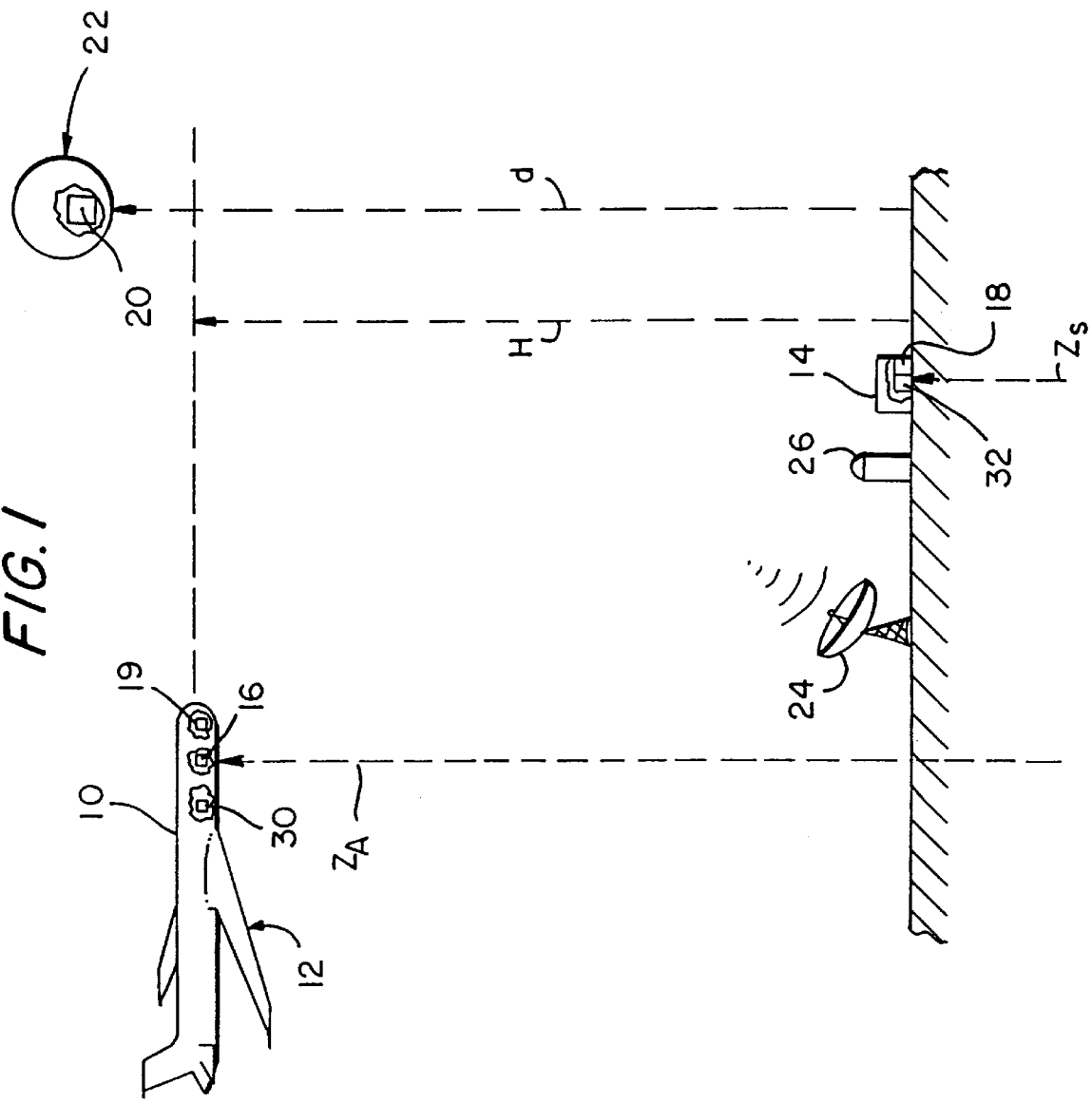
FIG. 1 illustrates diagrammatically an embodiment of the present invention wherein an aircraft equipped with a GPS receiver flies above a base station for calibrating the aircraft altitude sensor.

There is shown in FIG. 1, an aircraft 10 having at least one altitude sensor 12 (which may be located anywhere on the aircraft) and flying in the vicinity of a predeterminedly positioned base station 14. The altitude sensor 12 is of the barometric or pressure-sensing type which measures the atmospheric pressure outside the aircraft 10 through a pressure inlet port (generally known as static port) in, for example, the skin of the aircraft 10. The altitude sensor 12 includes a pressure transducer, commonly in the form of an aneroid capsule, whose output signal, typically a voltage signal, corresponds to the atmospheric pressure outside the aircraft. The output signal is converted by electronic or electromechanical means on board of the aircraft according to well known mathematical relations to a signal indicative of the pressure altitude of the aircraft. Pressure altitude, as used herein, refers to the height above sea level as measured by a pressure altimeter such as, for example, altitude sensor 12.

The output of the altitude sensor 12 may include errors such as, for example, static source error which is attributable to, for example, deformation of the static port. The static source error is specific to the aircraft and cannot be detected until the aircraft is in flight, i.e. when air flows over the inlet port of the sensor. Identification of these errors is necessary as they enable the crew of the aircraft to make the requisite adjustment to the aircraft altimetry system to improve the accuracy of the pressure altitude measurements. It is thus advantageous to provide a set of calibrated reference altitudes and pressures with which the measured values of the altitude sensor 12 can be compared.

As will be apparent hereafter, the height of the aircraft 10, and thus the height of the altitude sensor 12, can be advantageously obtained by determining the relative or geometric height H of the aircraft 10 with respect to the predeterminedly positioned base station 14 as shown representatively in FIG. 1. In a presently preferred embodiment, the geometric height H of the aircraft 10 is determined by forming a difference between the absolute or geopotential height $Z_A$ of the aircraft 10 as estimated by a satellite-based positioning device such as, for example, Global Positioning System receiver 16 installed on the aircraft 10 and the geopotential height $Z_S$ of the base station 14 as estimated by another GPS receiver 18 installed at or adjacent the base station 14. The absolute or geopotential height, as defined herein, is the distance between the center of the Earth and the location of the GPS receiver. It is contemplated that the aircraft 10 may also include a laser or radar type ranging device 19 for determining the geometric height of the aircraft 10 relative to the base station 14.

The present invention will be better appreciated with the following description of the Global Positioning System (GPS).

The GPS has a network of 24 satellites distributed among six orbits (four satellites in each orbit) but the number of satellites "visible" to a GPS receiver at any location varies with the time of the day. The GPS receiver determines its position at time $t_j$ by obtaining the location of each of the visible GPS satellites and by measuring the range of those satellites on the basis of the propagation time of the range signals from each of those satellites. Signals from at least four GPS satellites are needed to determine a three-dimensional position (e.g., longitude, latitude. and altitude) of the aircraft 10. The position of the GPS receiver is typically expressed in a global coordinate system or the so-called Earth-Centered Earth-Fixed (ECEF) coordinate system wherein the coordinate system origin is at the center of the Earth.

The accuracy of the position estimates of the GPS receiver is affected by a multitude of errors including errors in the satellite position, propagation-induced signal delays, errors from multipath signals, noise in the GPS receiver, and intentionally induced errors in the signals by the Department of Defense which maintains the GPS. The geopotential height or the altitude component of the position estimate suffers from the additional problem that its accuracy or resolution is limited by the geometric spatial relationships of the satellites. A dimensionless metric or parameter, known to an ordinary artisan as the position dilution of precision (PDOP), is often used to indicate the accuracy of the altitude estimate such that the smaller the PDOP value, the more accurate is the altitude estimate. Preferably, the PDOP value is less than 6.0. Typically, the altitude estimate computed by the GPS receiver has an error in the range of about 100 to 200 feet, which is unacceptable for altitude sensors intended for use in an RVSM airspace.

These errors, however, are substantially eliminated in the computed relative or geometric height because the aforementioned errors present in the absolute or geopotential height estimates are substantially cancelled in the process of forming their difference, provided the geopotential height estimates were obtained at substantially the same instant of time $t_j$. In such a case, the accuracy of the geometric height is quite high, as it has an error of less than about 10 feet.

The aircraft 10 need not fly directly over the base station 14 in order to obtain an accurate geometric height relative to the base station 14 because the aforementioned errors associated with the absolute or geopotential height estimates of the respective GPS receivers at any instant of time are of substantially the same magnitude over a large region (e.g. 50 miles radius about the base station 14) so long as the PDOP or the like is below an acceptable threshold value such as, for example, about 6. Thus, the aircraft GPS receiver 16 may begin measuring its geopotential heights and the aircraft altitude sensor 12 may begin measuring the atmospheric pressure as the aircraft 10 flies in the general vicinity of the base station 14 so long as the PDOP value is below an acceptable threshold value.

Preferably, the respective GPS receivers of the aircraft 10 and of the base station 14 are operatively connected to recording devices which record and time stamp the location estimates of both GPS receiver for each instant of time. It is contemplated that the base station 14 provides ready access to its geopotential height data over a communication link (wired or wireless) and that the base station GPS receiver 18 is operated continuously or substantially continuously so that an aircraft can determine its geometric height at any time.

To verify the accuracy of the pressures measured by the aircraft altitude sensor 12, reference pressures as a function of height above the base station must be generated. Preferably the reference pressures are generated several times a day (e.g. every six hours), since the weather may vary through the course of a day. In a presently preferred embodiment, the reference pressures are provided by a calibrated reference pressure sensor 20 disposed within an elevating device such as, for example, a balloon 22 filled with a lighter-than-air gas, e.g. helium, for elevating the reference sensor 20 continuously through a distance d above a region of the base station 14 such that d exceeds the flight level or altitude of aircraft 10.

Preferably, the reference pressure sensor 20 is enclosed inside the balloon 22; so disposed, the sensor 20 is advantageously protected from turbulent air flow that would otherwise introduce errors into the static atmospheric pressure measurements of the sensor 20. Other means of protecting the reference sensor 20 from turbulent air flow is also within the contemplation of the present invention including, without limitation, enclosing the sensor 20 in an elastic membrane and connecting the enclosed sensor to the outside of the balloon 22.

The balloon 22 preferably includes a radio transmitter (not shown), operatively connected to the reference sensor 20, for transmitting the pressure measurements at selected altitude increments or continuously from the reference sensor 20 as the balloon 22 floats upwardly away from the base station 14. A ground-based receiver and a data storage device 32 located proximate or at the base station 14 receive, record and preferably time stamp the pressure measurement data from the transmitter.

To obtain reference height measurements corresponding to the reference pressures, a height measuring device such as, for example, a ground-based radar 24 positioned at or adjacent the base station 14 is provided to measure the height of the balloon 22 (and thus the height of the reference pressure sensor 20 therein) as the balloon 22 is released into the atmosphere. Alternatively, or additionally a ground-based laser 26 may also be used to measure the height of the balloon 22. In any case, the reference height measurements are preferably time stamped and stored so that corresponding pressure and height measurements can be sorted or matched on the basis of the measurement time. The reference data can then be made available to a flight crew through any known communication means.

It is contemplated that instead of using ground-based radar and/or laser ranging devices 24, 26, the balloon 22 may be provided with a GPS receiver (not shown) so that the relative height of the balloon 20 with respect to the base station 14 can be computed as explained above.

In another preferred embodiment, a plurality or network of base stations 14 are provided over a large region (e.g. the entire continental U.S.) and that the balloons 22 are released substantially simultaneously from the plural base stations 14 to measure reference pressures above each base station 14. This step is preferably repeated through the course of a day. Furthermore, the aircraft GPS receiver 16 preferably includes or, alternatively, operatively connected to, a Kalman filter processor 30 which uses an adaptive correction algorithm known in the art, to interpret and compare, for example, the GPS data, geopotential height measurements, and measured and reference pressure data. Advantageously, the processor 30 permits the aircraft altimetry system to adjust or enhance its accuracy continuously or sequentially over a period of time. Another advantage of this preferred embodiment is that the aircraft altitude sensor 12 can be calibrated each time the aircraft 10 flies in the vicinity of each base station located along its flight path.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method for calibrating a pressure-sensing altitude sensor of an aircraft while the aircraft is in flight, comprising the steps of:

elevating a reference pressure sensor through a selected distance above a fixedly-located base station;

measuring a reference atmospheric pressure using the reference pressure sensor while the reference sensor is being elevated through the selected distance above the base station;

measuring a geometric height of the reference sensor relative to the base station while the reference sensor measures the reference atmospheric pressure;

measuring the atmospheric pressure outside the aircraft using the altitude sensor of the aircraft while the aircraft flies above the base station;

determining the geometric height of the aircraft relative to the base station while the altitude sensor of the aircraft measures the atmospheric pressure outside the aircraft; and comparing the pressure measurement of the altitude sensor of the aircraft with the reference pressure measurement of the reference pressure sensor at a geometric height that is substantially the same as the geometric height of the aircraft.

2. The method of claim 1, wherein the step of determining the geometric height of the aircraft further comprises the steps of:

providing a first position-determining device disposed on the aircraft for receiving range signals from a plurality of satellites and for computing a position of the aircraft with respect to a global coordinate system on the basis of the range signals;

computing a geopotential height of the aircraft relative to the global coordinate system using the first position determining device at an instant of time;

providing a second position-determining device disposed at the base station for receiving range signals from the plurality of satellites and for computing position of the base station with respect to the global coordinate system on the basis of the range signals;

computing a geopotential height of the base station relative to the global coordinate system using the second position-determining device at substantially said instant of time; and computing a geometric height of the aircraft relative to the base location at substantially said instant of time by forming a difference between the computed geopotential height of the aircraft and the computed geopotential height of the base station.

3. The method of claim 2, wherein the step of comparing includes the use of a Kalman filter algorithm.

4. The method of claim 2, further comprising the step of computing a numerical value for a position dilution of precision parameter (PDOP) prior to the step of determining the geometric height of the aircraft.

5. The method of claim 4, wherein the step of measuring the atmospheric pressure outside the aircraft is performed only when said PDOP parameter is less than a threshold value.

6. The method of claim 5, wherein the threshold value is about 6.

7. The method of claim 6, wherein the step of elevating includes the use of a balloon filled with a gas having a density less than that of air.

8. The method of claim 7, wherein the step of measuring a reference height includes the use of a radar disposed adjacent the base station.

9. The method of claim 8, wherein the selected distance to which said reference pressure sensor is elevated exceeds the altitude of the aircraft.

10. The method of claim 9, wherein the step of measuring a reference height includes the use of a third position determining device disposed proximate the reference sensor for receiving range signals from a plurality of satellites and for computing a position of the reference sensor with respect to the global coordinate system on the basis of the range signals, and further comprises the steps of computing a geopotential height of the reference sensor using the third position determining device, and forming a difference between the computed geopotential height of the reference sensor and the computed geopotential height of the base station, said difference being the reference height.

11. The method of claim 9, wherein the satellites form a portion of the Global Positioning System.

12. A method for calibrating a pressure-sensing altitude sensor of an aircraft while the aircraft is in flight, comprising the steps of:

elevating each of a plurality of reference pressure sensors through a selected distance above each of a plurality of fixedly-located base stations;

measuring reference atmospheric pressures above each of the base stations using the reference pressure sensors while each of the reference sensors is being elevated through the selected distance above said each of the base stations;

storing said reference atmospheric pressures of said each of the reference pressure sensors at said each of the base stations;

measuring a geometric height of said each of the reference sensors relative to its corresponding base station while said each of the reference sensors measures the reference atmospheric pressures above said each of the base stations;

measuring the atmospheric pressure outside the aircraft using the altitude sensor of the aircraft while the aircraft flies above said each of the base stations;

determining the geometric height of the aircraft relative to said each of said base stations while the altitude sensor of the aircraft measures the atmospheric pressure outside the aircraft;

retrieving the reference pressure measurements from said each of the base stations; and comparing the pressure measurements of the altitude sensor of the aircraft with the reference pressure measurements above said each of said base stations at a geometric height that is substantially the same as the geometric height of the aircraft above said each of the base stations.

13. The method of claim 11, wherein the step of comparing includes the use of a Kalman filter algorithm.

* * * * *